E. H. Crane,
Leather-Channeling Tool,
N°. 45,978.      Patented Jan. 24, 1865.

Witnesses:

Inventor:

UNITED STATES PATENT OFFICE.

ELLIOTT H. CRANE, OF JONESVILLE, MICHIGAN.

LEATHER-CHANNELING TOOL.

Specification forming part of Letters Patent No. 45,978, dated January 24, 1865.

*To all whom it may concern:*

Be it known that I, ELLIOTT H. CRANE, of Jonesville, in the county of Hillsdale and State of Michigan, have invented a new and Improved Leather-Channeling Tool; and I do hereby declare that the following is a full, clear, and exact description thereof, which will enable others skilled in the art to make and use the same, reference being had to the accompanying drawings, forming part of this specification, in which—

Figure 1:
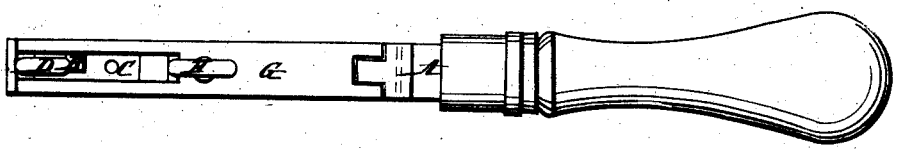
Figure 2:
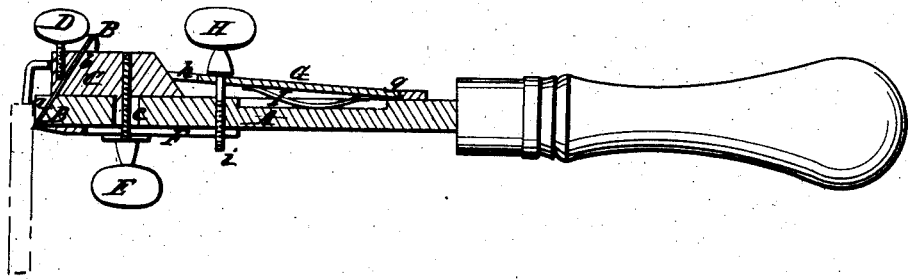
Figure 3:
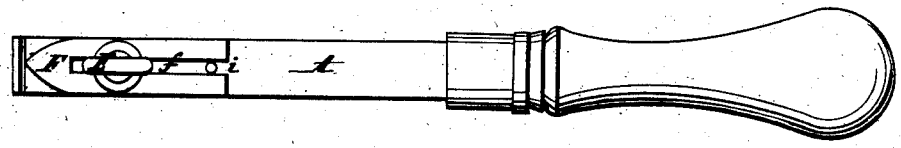

Figure 1 is a plan view of my invention; Fig. 2, a side sectional elevation of the same; Fig. 3, a reversed plan view of the same.

Similar letters of reference indicate like parts.

The object of this improvement is to facilitate the cutting of V-shaped channels upon the edges of harness-straps, boot and shoe soles, and upon all kinds of leather articles where channeling is required. I denominate my invention "The Improved Universal Channeler."

A is a metallic shank, having a suitable handle attached. The front end of the shank A is provided with an inclined recess, *a*, to receive and guide the lower end of an inclined cutter, B, which is held in an adjustable cutter-block, C, which latter has a longitudinal adjustment upon the shank A. The cutter B is supported within an inclined slot, *b*, in the block C, as shown, the cutter being held in any desired position within its slot *b* by means of the set-screw D, which passes down through the block C until it presses against the cutter B, as shown.

The longitudinal adjustment of the cutter B and its block C is adjusted by means of a set-screw, E, which passes from the under side of the shank A up through a slot therein, *c*, into the block C. By loosening the screw E the block C may be set either forward or back, thus carrying the end of the cutter B out from the end of the shank A, or drawing it nearer to said shank, as desired. By this longitudinal adjustment of the block C by means of screw E, and the vertical adjustment of the cutter B by means of screw D, the size of the channel to be cut may be readily governed.

The vertical cutting of the leather is accomplished by means of a cutter, F, which moves longitudinally upon the face of the shank A, being secured and adjusted thereon by means of the screw E, the rear part of the cutter F being longitudinally slotted at *f* to permit longitudinal adjustment. The screw E thus serves to adjust both the cutter F and the block C.

The edge of the cutter F is intended to project longitudinally beyond the end of the shank A far enough to meet or pass the point of the cutter B, and when the two cutters are thus adjusted they will cut a V shaped channel in the leather.

The gaging or regulation of the distance from the edge of the leather at which the two cutters will act is effected by means of a gage, G, the rear end of which is hinged or pivoted at *g* to the shank A. The front end of the gage G is bent in hook form, so as to project over the extremity of the shank A. The outer end of the gage G is also slotted at *k*, to permit it to pass over the block C, as shown.

The gage G is adjusted to or from the shank A by means of a set-screw, H, which passes through the shank A. The extremity *h* of the screw H serves as a pin, *i*, within the slot *f* of the cutter F, to prevent lateral displacement thereof. Between the gage G and the shank A there is a spring, I, which throws the gage G outward when its screw H is relaxed.

The pivoted end of the gage G serves as a bearer or guide, which is pressed against the edge of the leather.

By adjusting the gage G more or less over the end of the shank A the distance from the edge of the leather at which the cutters act may be regulated at will.

The combined action of the gage and cutters will be readily understood by reference to Fig. 4, in which the red lines indicate a leather strap the surface of which is being channeled.

I do not confine myself to the exact construction of parts here shown.

Having thus described my invention, I claim as new and desire to secure by Letters Patent—

1. The combination of the adjustable gage G with the shank A, substantially in the manner herein shown and described.

2. The combination of the block C and cutter B with the shank A, substantially as herein shown and described.

3. The combination of the cutter F with the cutter B, block C, and shank A, substantially as herein shown and described.

4. The combination of the gage G with the block C, cutters B F, and shank A, substantially in the manner herein shown and described.

ELLIOTT H. CRANE.

Witnesses:
 ENEAS SMITH,
 ANDREW P. HOGARTH.